United States Patent [19]

Kinderman et al.

[11] Patent Number: 4,530,721

[45] Date of Patent: Jul. 23, 1985

[54] LITHOGRAPHIC FOUNTAIN CONCENTRATE

[75] Inventors: Gerard H. Kinderman, St. Paul, Minn.; James F. Sanders, Hudson, Wis.

[73] Assignee: Minnesota Mining and Manufacturing Company, St. Paul, Minn.

[21] Appl. No.: 533,927

[22] Filed: Sep. 20, 1983

[51] Int. Cl.[3] ........................... C09K 3/00; C08K 3/34

[52] U.S. Cl. ........................................ 106/2; 430/331; 524/442

[58] Field of Search ............................ 106/2; 524/442

[56] References Cited

U.S. PATENT DOCUMENTS

| | | | |
|---|---|---|---|
| 2,582,347 | 1/1952 | Newman | 106/2 |
| 3,398,002 | 8/1968 | Boudurant et al. | 106/2 |
| 3,829,319 | 8/1974 | Suzuki et al. | 106/2 |
| 4,200,688 | 4/1980 | Garrett et al. | 106/2 |
| 4,214,531 | 7/1980 | Garrett et al. | 106/2 |
| 4,247,328 | 1/1981 | Lawson et al. | 106/2 |

*Primary Examiner*—Theodore Morris
*Attorney, Agent, or Firm*—Donald M. Sell; James A. Smith; Gerald F. Chernivec

[57] ABSTRACT

A lithographic concentrate capable of being mixed with water to provide a lithographic fountain solution comprising a low molecular weight polyacrylic acid, colloidal silica and, preferably, phosphate ion.

7 Claims, No Drawings

LITHOGRAPHIC FOUNTAIN CONCENTRATE

FIELD OF THE INVENTION

The present invention relates to a concentrate suitable for use, when diluted with water, as a lithographic fountain solution comprising colloidal silica, a defined polyacrylic acid, and preferably phosphate ion. This fountain solution has been found to provide improved press latitude especially when utilized with gelatin-surfaced printing plates manufactured by the silver halide diffusion transfer process.

DESCRIPTION OF THE PRIOR ART

Conventional lithographic printing is accomplished by the application of both water, or a dampening solution, and an ink to the surface of printing plates such that the image areas thereof selectively accept ink while the non-image or background areas selectively accept water, following which the ink is transferred from the image areas to a copy substrate, such as paper. Therefore, in order to maintain excellence in printing, it is necessary that the difference between the oleophilicity of image areas and the hydrophilicity of non-imaged or background areas is sufficiently great such that when the dampening solution and an ink are applied to the printing plate surface, the image areas accept a sufficient quantity of ink and the background areas accept no ink.

It is widely known that gelatin-surfaced printing plates exhibit a rather narrow press ink/water latitude, i.e., a rather narrow range of press ink/water balance adjustment to insure adequate ink supply to the plate image areas, when utilizing colored rubber-based inks in presses having integrated dampening systems, i.e., wherein the inking roller itself carries the dampening solution, as opposed to separate hydrophilic roller.

While a variety of materials have been available as additives for fountain solutions, such have not been found to satisfactorily cure the aforementioned problems. For example, U.S. Pat. No. 4,238,279 discloses a composition which can be utilized to treat the surface of a lithographic plate, or can be utilized as a dampening solution. However, the compositions disclosed therein have not been found satisfactory when utilized with a gelatin-surfaced plate in conjunction with a press having an integrated dampening system. U.S. Pat. No. 3,726,823 discloses a composition designed to prevent a printing cylinder surface of a conventional offset printing press from being contaminated with conventional printing ink.

SUMMARY OF THE INVENTION

In accordance with the invention there is provided a lithographic concentrate capable of being diluted with water to provide a lithographic fountain solution comprising from about 1.0 to 15.0 percent of a polyacrylic acid having a weight average molecular weight of less than about 30,000; from about 0.25 to about 3.0 percent by weight of colloidal silica, based on silica solids; and, preferrably, an effective amount of phosphate ion.

DETAILED DESCRIPTION OF THE INVENTION

We have now discovered that by utilizing fountain solution concentrates which contain colloidal silica together with a high concentration of a low molecular weight polyacrylic acid improved press latitude is obtained with gelatin-surfaced plates, such as the "Onyx" brand plate, commercially available from the 3M Company.

The polyacrylic acid component should be of relatively low molecular weight, i.e., the weight average molecular weight (Mw) should not exceed about 30,000. Preferably, Mw is less than about 20,000.

While not as critical, it is also preferred that the number average molecular weight (Mn) should not exceed about 20,000, and more preferably is less than about 10,000.

Increasing molecular weights tend to increase misting of fountain solution from the press rollers and increased ink emulsification, leading to reduced printing quality.

The polyacrylic acid should be present at from about 1.0 to about 15.0 percent by weight of the concentrate, with about 6.0 percent being preferred.

During the preparation of suitable polyacrylic acid via a polymerization technique, other comonomers can be included if desired, as long as the requisite concentration of polyacrylic acid is present in the final product.

To allow proper adjustment of pH of the concentrate, a counter ion for the acid is typically required. (Fountain solutions are typically at a pH of from about 3.5 to 5.5, a suitable range for printing) While a number of counter ions are suitable for this purpose, we have found that lithium is the most desirable. Lithium has been found to optimize shelf life of the concentrate by reducing the tendency of the colloidal silica component to coagulate.

The colloidal silica component is typically commercially available as colloidal silica suspension containing, for example, thirty percent by weight silica in water. While such materials can be manufactured, they are available from a variety of chemical suppliers, such as the DuPont Chemical Company. Our concentrate should contain from about 0.25 to about 3.0 percent by weight silica, based on silica solids.

Our concentrate has also found excellent utility when used with metal-surfaced printing plates. In this instance, it has been determined that phosphate ion should be added to the concentrate in an effective amount; e.g. about 0.1 percent by weight, whereupon increased press latitude with metallic surfaced plates has been found. In addition, phosphate ion has provided no deliterious effects relative to a gelatin-surfaced plate, and therefore a press can be utilized with a variety of commercially available printing plates without the necessity of changing the fountain solution.

In addition, an alcohol such as ethanol or isopropanol can be included in the concentrate, such materials being known to minimize undesired ink emulsification and extend the life of the colloidal silica suspension. Conventional coloring agents may also be included as desired.

In general, concentrates such as ours would not be considered useful, because high concentrations of ionic polymers have been taught to increase coagulation of colloidal silica, which would render the resultant fountain solution ineffective. However, it has been found that the combination of the low molecular weight polyacrylic acid, particularly as a lithium partial salt, prevents this expected coagulation. Furthermore, the reduced molecular weight of the polyacrylic acid has been found to prevent another problem typically expected with fountain solutions, that being the emulsification of the printing ink, especially at high press speeds.

In use, a press operator would dilute the concentrate of the invention with water to form a fountain solution. Typical dilution ratios would be from 10 to 15 to one.

The fountain solution concentrate of our invention will now be further exemplified by the use of the following examples. In these examples, the printing press utilized was an AB Dick "360 CMC", commercially available from the AB Dick company. The inks utilized were "Van Son Rubber Base Plus VS355" (VANDIJK Brown) and "Van Son Rubber Base Plus VS306" (Pantone Reflex Blue) both commercially available from Van Son Holland Ink Corporation.

Unless otherwise specified, the printing plate utilized was an "Onyx" brand plate commercially available from the 3M Company, with processing thereof being undertaken in a "MR412" brand processor commercially available from the 3M Company. All parts are by weight unless otherwise specified.

EXAMPLE 1

A polyacrylic acid polymer was made by mixing the following components:

| Component | Parts by Weight |
|---|---|
| acrylic acid | 15.0 |
| mercapto-acetic acid | 0.75 |
| potassium persulfate | 0.075 |
| distilled water | 84.2 |

The reaction vessel containing the mixture was flushed with nitrogen to remove as much oxygen as possible following by heating to 55° C. After the expected exthotherm from the polymerization reaction, the container was maintained at 55° C. for 12 hours with a nitrogen purge. The resultant polymer had a number average molecular weight (Mn) of 4,800 and a weight average molecular weight (Mw) of 12,300, determined using gel permeation chromotography. The percent conversion of monomer to polymer was in excess of 96%.

A fountain concentrate was then made by mixing the following components:

| Component | Parts by Weight |
|---|---|
| polyacrylic acid (15% solids) | 40.0 |
| phosphoric acid | 0.1 |
| 1.0 normal lithium hydroxide | 44.0 |
| "Ludox AM" silica, a 30% solid colloidal silica solution, commercially available from DuPont Chemical | 4.9 |

The lithium hydroxide was added to provide a pH to the concentrate of 4.7.

This concentrate was then diluted with 9 parts of water followed by testing as discussed above. The press was run to 4,000 impressions at the highest possible press speed, and no misting of the water was observed; the degree of emulsification of the ink was acceptable, i.e., minimum uneven distribution of the ink in the press was observed; no toning was observed, i.e., no ink was deposited in the non-image or background areas of the plate; and excellent print quality was maintained throughout the press run.

The press was then reduced in speed to its lowest possible, and prints were again made having excellent quality. This testing is a further indication of the wide printing latitude found through use of our fountain concentrate.

Finally, the "Onyx" brand plate was removed from the press and a "K+" brand metal plate, commercially available from the 3M Company, was installed on the press and run to 1,000 copies. Again, prints having excellent quality were obtained.

EXAMPLE 2

Example 1 was duplicated with the exception that the concentration of the polyacrylic acid solution was reduced from 40.0 parts to 4.0 parts, which creates the level of hydrophilic polymer, commonly utilized in fountain concentrates. The reduced quantity of polyacrylic acid required a similarly reduced quantity of lithium hydroxide to adjust the solution to a pH of 4.7. In this instance, press results utilizing this fountain concentrate illustrated that the gelatin-surfaced plate had a strong toning tendency, and thus the concentrate was unsatisfactory.

EXAMPLE 3

Example 1 was duplicated with the exception that a corresponding molar quantity of acetic acid was utilized instead of polyacrylic acid. Press results were again determined to be unsatisfactory because of the toning characteristics of the gelatin-surfaced plate.

This Example, in combination with Example 2, clearly demonstrates that it is the high level of low molecular weight polyacrylic acid which affords the clean printing properties of the fountain solution.

EXAMPLE 4

The fountain concentrate of Example 1 was duplicated with the exception that colloidal silica was omitted. Press tests indicated an unsatisfactory toning tendency.

This demonstrates that silica, along with the polyacrylic acid, is necessary to provide a clean printing operation.

EXAMPLE 5

Example 1 was duplicated with the exception that the phosphate was not included therein. Press tests utilizing the gelatin-surfaced plate indicated that there was no adverse effect thereon, i.e., a clean press operation was obtained. However, when the metal plate noted in Example 1 was press run using this fountain solution, press results indicated a diminished ink/water latitude.

This Example illustrates that a very small quantity of phosphate ion, (about 0.005 percent by weight in the fountain solution) is desirable if the fountain solution is to be utilized for both metal and gelatin surfaced plates.

EXAMPLES 6-9

In these Examples, polyacrylic acid polymers of varying molecular weights and molecular weight distributions were made by varying the quantity of mercaptoacetic acid in the monomer mixture before polymerization. The polymers utilized are as follows:

| Example Number | Mn | Mw |
|---|---|---|
| 6 | 7,580 | 17,300 |
| 7 | 12,600 | 34,200 |
| 8 | 8,500 | 40,600 |
| 9 | 23,800 | 72,400 |

The polymer of Example 8 was a commercially available low molecular weight polyacrylic acid, "Grade A-1", commercially available from Rohm & Haas, Inc.

After preparing fountain solutions and testing as per Example 1, it was found that while all of the fountain solutions would press run the gelatin-surfaced plates clean, the fountain solutions from Examples 7–9 exhibited excessive misting of water from the ink train and caused excessive emulsification of ink in the press ink train at high press speeds, and therefore these were considered unacceptable.

These results lead to a conclusion that press performance is directly related to molecular weight of the polyacrylic acid.

What is claimed is:

1. A lithographic concentrate capable of being diluted with water to provide a lithographic fountain solution comprising from about 1.0 to about 15.0 percent by weight of a polyacrylic acid having a weight average molecular weight of less than about 30,000 and from about 0.25 to about 3.0 percent by weight of colloidal silica, based on silica solids.

2. The concentrate of claim 1 wherein said molecular weight is less than about 20,000.

3. The concentrate of claim 1 further containing an effective amount of phosphate ion.

4. The concentrate of claim 1 further containing an effective amount of lithium ion.

5. The concentrate of claim 1 wherein said polyacrylic acid has a number average molecular weight of less than about 20,000.

6. The concentrate of claim 1 wherein said polyacrylic acid comprises about 6.0 percent by weight and has a weight average molecular weight of less than about 20,000.

7. The concentrate of claim 1 further comprising an effective amount of at least one alcohol.

* * * * *